United States Patent

Norberg

[15] 3,699,524

[45] Oct. 17, 1972

[54] ADAPTIVE DATA PRIORITY GENERATOR

[72] Inventor: Gayle R. Norberg, Minneapolis, Minn.

[73] Assignee: Control Data Corporation, South Minneapolis, Minn.

[22] Filed: Aug. 10, 1970

[21] Appl. No.: 62,413

[52] U.S. Cl. ..........340/172.5

[51] Int. Cl. ..........G06f 9/18

[58] Field of Search..........340/172.5

[56] References Cited

UNITED STATES PATENTS

| | | | |
|---|---|---|---|
| 3,333,252 | 7/1967 | Shimabukuro | 340/172.5 |
| 3,482,264 | 12/1969 | Cohen et al. | 340/172.5 |
| 3,573,856 | 4/1971 | Best et al. | 340/172.5 |
| 3,553,656 | 1/1971 | Bernhardt | 340/172.5 |
| 3,478,321 | 11/1969 | Cooper et al. | 340/172.5 |
| 3,399,384 | 8/1968 | Crockett et al. | 340/172.5 |
| 3,568,165 | 3/1971 | Kerr | 340/172.5 |
| 3,370,276 | 2/1968 | Schell, Jr. | 340/172.5 |

*Primary Examiner*—Gareth D. Shaw
*Assistant Examiner*—Sydney R. Chirlin
*Attorney*—Paul L. Skjoquist

[57] ABSTRACT

The invention comprises apparatus for assigning priority among several data channels being multiplexed into one data bus. Priority is based partly on recent usage history, and is increased for those channels having frequent recent use. Additionally, those channels which have requested, but have not received service are given continually increasing priority until service is granted.

18 Claims, 4 Drawing Figures

INVENTOR
GAYLE R. NORBERG

BY *Paul L. Sjoquist*

ATTORNEY

INVENTOR.
GAYLE R. NORBERG
BY Paul L. Sjoquist
ATTORNEY

ADAPTIVE DATA PRIORITY GENERATOR

BACKGROUND OF THE INVENTION

The apparatus of this invention provide one solution to the problem of assigning priorities among several data channels whose requests for service have become backlogged. This backlog occurs partly because the data bus can communicate with only one channel at a time and partly because of bunching of several requests. (By data bus is meant a data channel into which several sources or receivers of data have been multiplexed.) The problem is often solved by taking the earliest request first. Another popular method is for the data bus to scan each channel in cyclic order and process those channels requesting service. Sometimes the various channels are classified according to importance, and priority is given to the more important channels before the less important are serviced. Still another solution is to allow random selection of each channel. All these solutions have their advantages and disadvantages. Some do not handle important data quickly enough and possibly lose it. With others, low priority channels are rarely serviced due to the activity of high priority channels.

This invention assigns relatively high priority to a channel if:

a. a channel has had a relatively large amount of recent usage; or b. a channel has been passed over in favor of channels with higher priority relatively often.

These two criteria operate in concert according to preset parameters, so that in general either category of channel can prevail over the other.

An object of this invention is to provide an orderly and dependable assignment of priorities in a data communication system.

A second object is to insure that important data will be transmitted more quickly than less important data.

A third object is to insure that all channels will have at least occasional access to the data bus.

A fourth object is to provide an inexpensive method of selecting channels for service on a priority basis.

Other objects will become apparent to one skilled in the art upon understanding the operation of the apparatus of the invention.

BRIEF DESCRIPTIONS OF THE DRAWINGS

DESCRIPTION OF THE PREFERRED EMBODIMENTS

Figure 1:
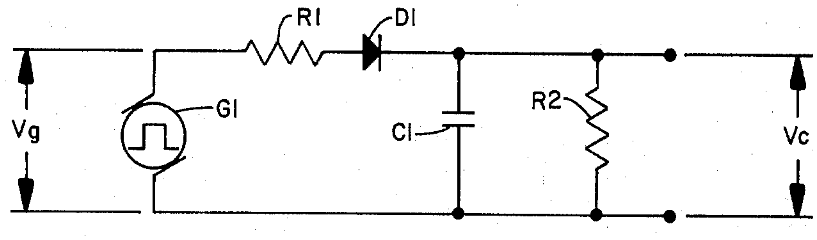
FIG. 1 is a simplified version of the priority computing circuit.

Referring first to FIG. 1, G1 is a pulse generator generating positive voltage pulses. The output of pulse generator G1 is connected to one terminal of resistor R1. The other terminal of resistor R1 is connected to the anode of diode D1. The cathode of diode D1 is connected to one terminal of capacitor C1 and one terminal of resistor R2. The other terminal of pulse generator G1 is connected to the other terminals of capacitor C1 and resistor R2. When a pulse is emitted from pulse generator G1 it flows through resistor R1 and diode D1 and places a charge upon capacitor C1. This charge on capacitor C1 produces a voltage $V_c$ across capacitor C1. Diode D1 prevents discharge of capacitor C1 through pulse generator G1. Resistor R2 is chosen so as to allow only a very slow discharge of capacitor C1, compared to the speed at which it is charged during a pulse from pulse generator G1. Each pulse impressed on capacitor C1 is sufficient to add a charge on capacitor C1 which increases $V_c$ by only a fraction of $V_p$, the maximum voltage of the pulse from pulse generator G1. Thus measuring $V_c$ at any time yields some indication of the number of pulses generated and whether these pulses have occurred recently or not.

Figure 2:
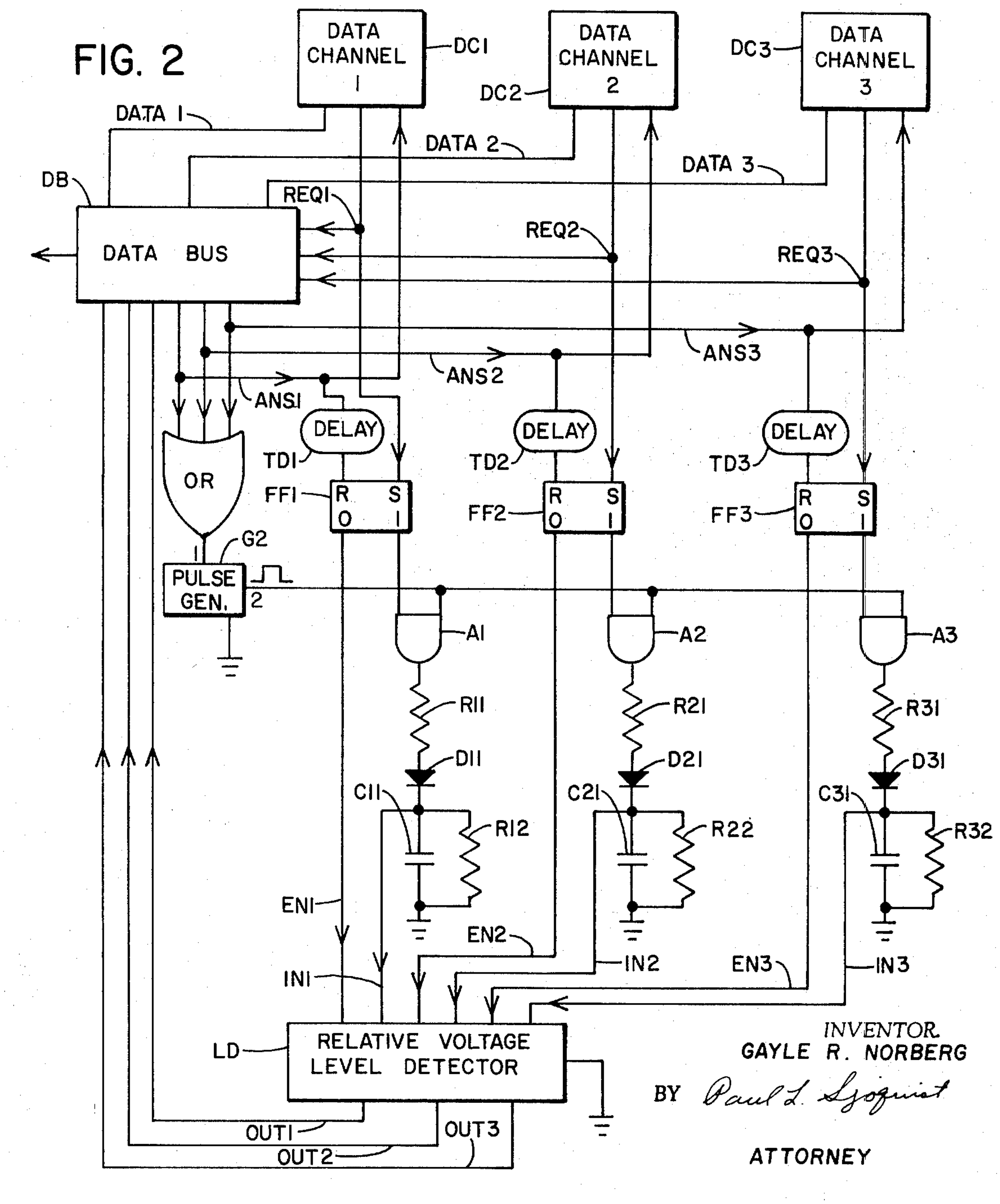
FIG. 2 is a combined logic and circuit diagram of the complete priority computing apparatus for three channels operating into one data bus.

Referring now to FIG. 2, G2 is a pulse generator similar to pulse generator G1. It produces a positive logic pulse at terminal 2 in response to a positive input logic pulse at terminal 1. As is true for all logic components described in FIG. 2, pulse generator G2 has two voltage levels associated with its input and output: the low level will be assumed to have a 0 volt state corresponding to Boolean 0 and a high level $+V_1$ state corresponding to Boolean 1. All logic elements are conventional, non-inverting circuitry familiar to those skilled in the art of logic design, and produce logic level outputs in response to logic level inputs, except as noted. The circuit of FIG. 1 is incorporated in three similar sections of FIG. 2. Reference will be made first to the section composed of time delay TD1, flip-flop FF1, AND gate A1, resistor R11, diode D11, resistor R12, capacitor C11, and data channel DC1 in explaining the computation of the priority function. The "set" input of flip-flop FF1 receives a positive going, service requesting pulse from data channel DC1 via output line REQ1. The "1", or set, output of flip-flop FF1 is connected to one input terminal of AND gate A1. The other input terminal of AND gate A1 is connected to terminal 2 of pulse generator G2. The output of AND gate A1 is connected to resistor R11. The other terminal of resistor R11 is connected to the anode of diode D11. The cathode of diode D11 is connected to both resistor R12 and capacitor C11, whose other ends are both grounded. The junction of diode D11 and capacitor C11 is connected to one input of the relative voltage level detector LD. The reset input of flip-flop FF1 is connected to the output of time delay TD1. The "0" output of flip-flop FF1 is connected to signal line EN1 of relative voltage level detector LD. This is a special circuit described in detail later, which tests the voltage on those INj lines whose corresponding ENj lines have logical 0's applied to them. (The *j* in EN*j*, e.g., is intended to have the subscript sense, as in mathematical expressions. Thus EN*j* means one or more of lines EN1, EN2 and EN3 as the context requires. That is, *j* is an integer variable whose value in this case can be 1, 2, or 3.) Which ever of these IN*j* lines has the highest voltage applied to it causes its corresponding output terminal, OUTj, to produce a logical 1. All other OUTj terminals produce logical 0. Output line ANS1 of data bus DB transmits a signal pulse each time data channel DC1's service request is answered.

Output line ANS1 is connected to one of the three inputs of logic gate OR and to the input side of time delay TD1. Data channel DC1 communicates with data bus DB via communication line DATA1. The data bus DB also receives the control signals applied to terminal REQ1 and control signals from output terminal OUT1 of relative voltage level detector LD.

The connections for the sections devoted to channels DC2 and DC3 are identical except that different channels are involved.

In explaining the operation of the apparatus of FIG. 2, assume that initially all flip-flops are cleared, all capacitors are discharged, all channels are inactive and corresponding components in each similar circuit are identical. Initially, assume that data channel DC1 requests service. When only one request is present, data bus DB does not request priority determination, but immediately begins the processing of channel DC1's request. A request is generated by data channel DC1 which sets flip-flop FF1 immediately. Data bus DB generates an answer signal to the request on line ANS1 signaling data channel DC1 to begin communicating on communication line DATA1 and also starts a signal passing through time delay TD1. With the "1" output of flip-flop FF1 set, AND gate A1 is enabled so as to allow a pulse from pulse generator G2 to pass through it. The signal on line ANS1 causes a 1 output from the OR gate. This output is impressed on pulse generator G2 and causes a short pulse to be emitted from pulse generator terminal 2. This pulse, appearing on the output of AND gate A1 and traveling through resistor R11 and diode D11 to capacitor C11, is sufficient to partially charge capacitor C11, causing a voltage to appear across it. A short time after the pulse has passed through AND gate A1 the answer signal from the data bus DB on line ANS1 appears on the output side of time delay TD1 resetting flip-flop FF1, and causing its "1" output to return to the 0 state. This will normally occur much more rapidly than the actual data transfer time required by data channel DC1.

Now consider the circuitry in FIG. 2 comprised of TD2, flip-flop FF2, resistor R21, diode D21, AND gate A2, resistor R22, and capacitor C21, which is the circuitry which computes priority for channel DC2. If, while channel DC1 still is occupying data bus DB, data channel DC2 requests service, then flip-flop FF2 will be set. When service to data channel DC1 is completed data bus DB will immediately start servicing data channel DC2, generating an answer at line ANS2 and communicating on line DATA2. As explained for channel DC1, a pulse will issue from the pulse generator G2 causing capacitor C21 to become partially charged. The line ANS2 pulse will eventually cause flip-flop FF2 to reset, as the terminal ANS1 pulse reset flip-flop FF1.

Suppose that immediately following the termination of service to channel DC2, channel DC3 requests service. The operation of the circuitry composed of time delay TD3, flip-flop FF3, resistor R31, diode D31, AND gate A3, resistor R32, and capacitor C31 will be similar to that caused by similar requests form channels DC1 and DC2. Now, while channel DC3 receives service supposed channels DC1 and DC2 both request service. Assuming the channel DC1 and DC2 priority circuitry are identical, the voltage across capacitor C21 will be greater than that across capacitor C11, because capacitor C21 has not been discharging as long through resistor R22 as capacitor C11 has been discharging through resistor R12. The data bus DB circuitry is designed to refer to relative voltage level detector LD whenever conflicting service requests are present. A 1 will be present at the OUT*j* terminal whose corresponding IN*j* terminal has the highest voltage among all IN*j* terminals having 0's on their corresponding EN*j* terminals. There may be a higher voltage on other IN*j* lines, but if the associated EN*j* line is not held at 0 because its flip-flop is set then its associated OUT*j* line will be 0 regardless. Since in this example only flip-flops FF1 and FF2 are set, lines EN1 and EN2 will be 0 and line EN3 will be at logical 1. Therefore line OUT2 will be 1 because capacitor C21 is charged to a higher voltage than capacitor C11. Lines OUT 1 and OUT 2 will be at logical 0. Data bus DB senses this condition and grants service to data channel DC2 upon termination of service to data channel DC3. This illustrates the effect of one priority factor, viz. the assigning of higher priority on the basis of more recent usage of the channel.

The answering of the request from data channel DC2 will cause a pulse to be generated by pulse generator G2. Since the requests for service from data channels DC1 and DC2 have set both flip-flops FF1 and FF2, AND gates A1 and A2 will both be enabled. Therefore a pulse from pulse generator G2 will place additional charge on both capacitors C11 and C21. After these pulses have passed through their respective AND gates, time delay TD2 will pass the line ANS2 pulse, clearing flip-flop FF2.

To illustrate the second priority factor, assume that while data channel DC2 is being processed due to the request just discussed, and after the pulse from pulse generator G2 produced by the answer to that request has been received by AND gates A1 and A2, data channel DC3 requests service. Since data channel DC1 has requested, but not yet received, service it will be competing with data channel DC3 for priority when data bus DB is through with data channel DC2. Assuming again that the priority circuit for each channel is identical, capacitor C11 will have a higher voltage on it than capacitor C31. The history of the charging of capacitors C11 and C31 is as follows:

a. a standard pulse partially charged capacitor C11;

b. later in time an identical standard pulse partially charged capacitor C31;

c. at the same time a similar pulse added charge to capacitor C11.

Since capacitor C11 had a partial charge on it at the time that it received the second pulse, it had, immediately after the second pulse, a greater charge and hence greater voltage, than it had after receiving the pulse in (a) above. It also had immediately after receiving its second pulse, a greater voltage across it than capacitor C31 had across it. Since both capacitors are identical, and their discharge resistors R12 and R32 are also identical, the discharge curves for both capacitors will be similar. Until it has discharged, or until capacitor C31 receives more charging pulses than capacitor C11, C11 will have a greater charge on it than capacitor C31. Level detector LD will now test the voltages across capacitors C11 and C31 and produce a 1 output on line OUT1 and a 0 on lines OUT2 and OUT3. The voltage across capacitor C21 is greater than that across capacitor C11, but since flip-flop FF2 is not set, line EN2 has a 1 applied to it and capacitor C21 is not included in the comparison. Again data bus DB will sense the 1 on line OUT1 and give data channel DC1 access first. Thus, here priority is given on the basis of the length of time a channel had been requesting service unsuccessfully and this basis prevailed over a channel having more recent use.

Figure 3:
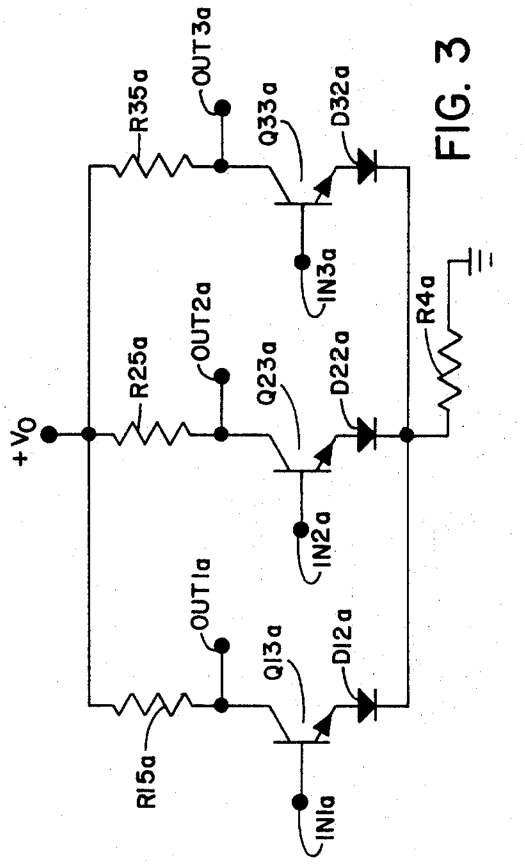
FIG. 3 is a simple circuit diagram illustrating the operation of a relative voltage level detector.

The simplified version of the relative voltage level detector shown in FIG. 3 is formed from three almost identical circuits. In circuit 1, resistor R15*a* is connected to the collector of NPN transistor Q13a. The emitter of transistor Q13*a* is connected to the anode of diode D12*a*. The voltage to be compared by this circuit is connected to the base of transistor Q13a via terminal IN1*a*. The output terminal OUT1*a* is connected to the collector of transistor Q13*a*. An identical circuit comprising resistor R25*a*, NPN transistor Q23*a*, and diode D22*a* receives the second voltage. A third similar circuit comprising resistor R35*a*, NPN transistor Q33*a*, and diode D32*a* receives the third voltage to be compared. The free ends of the resistors are all connected to the positive voltage source $V_o$. The cathodes of all the diodes are connected to one terminal of resistor R4*a*, and the other terminal of resistor R4*a* leads to ground.

The diodes hold the emitters of the transistors one diode voltage drop above the voltage across resistor R4*a*. No transistor will conduct unless the voltage applied between its base and ground is at least a diode drop greater than the sum of the drop across its external diode, and the voltage across resistor R4*a*. If the voltage at, say terminal IN1*a*, becomes more positive than this, transistor Q13*a* will begin to conduct. The current flowing through transistor Q13*a* will also flow through resistor R4*a*, increasing the voltage drop across it. The voltage applied to the base of transistor Q13*a* will stabilize and current through resistor R4a, transistors Q23*a* and Q33*a* will be held cut off because of the increased voltage on their emitters until the voltage at terminals IN2*a* or IN3*a* becomes as high as that at terminal INl*a*. When transistor Q13*a* begins to conduct, a current will flow through resistor R15*a*. The voltage drop across resistor R15*a* caused by this current will be reflected in a change in the voltage on output terminal OUT1*a*, causing it to drop from the value it had, almost exactly equal to $V_o$, when transistor Q13*a* was turned off. If later the voltage applied to terminal IN2*a* rises to a higher value than that applied to terminal IN1*a*, transistor Q23*a* will begin to conduct. The additional current through resistor R4*a* will increase the drop through it. This increase in drop will tend to cause transistor Q13*a* to be turned off. Therefore terminal OUT2*a*'s voltage will decrease and the terminal OUT1*a*+s voltage will increase to its original value of approximately $V_o$. Similarly, if the input voltage at terminal IN3*a* rises above that of any other input voltage, the voltage at terminal OUT3*a* will become low and that at the other output terminals will rise to $V_o$. In ideal operation the low output voltage would in all cases have the same value, if its respective input voltage is higher than the other input voltages. If, however, two input voltages are close to each other, the output voltages may reach a transition state between the low state and $V_o$. This effect can be largely eliminated by selecting transistors whose conduction changes from cut-off to saturation for a very small base voltage change.

When the voltage across any capacitor in FIG. 2 is lower than a certain reference point, it has relatively little value as a measure of the prior history of use of that channel. Therefore the diodes D12*a*, D22*a* and D32*a*, operating together with the normal drop between base and emitter of each transistor, defines an input voltage threshold. If all inputs are below the respective thresholds, none will cause their associated transistor to conduct. In such cases, and in the case where two input voltages are almost exactly equal and are both producing a 1 output voltage, data bus DB must select according to some previously defined subpriority or choose randomly to eliminate the conflict. If the voltages are very close it is reasonable to believe that very little danger exists in granting one of such channels priority over another. Furthermore, the channel "losing" that time will "win" the next.

Figure 4:
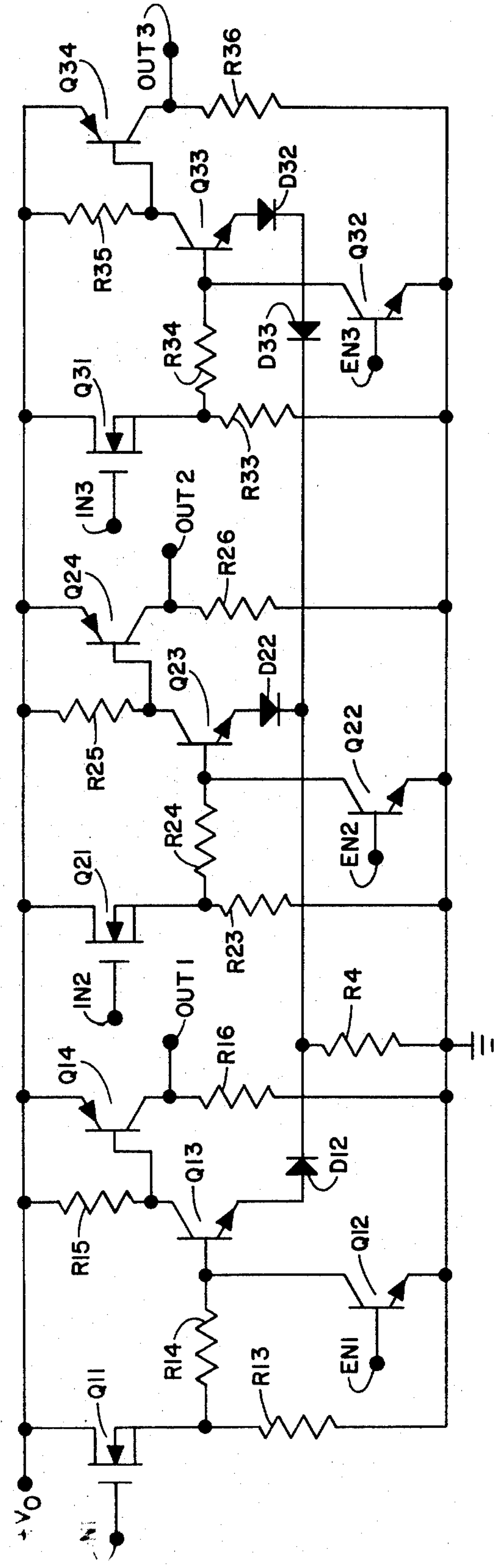
FIG. 4 is an operational relative voltage level detector circuit.

While the circuit in FIG. 3 functions adequately as a voltage level detector, it has several disadvantages in the intended application. The transistors have a relatively low input impedance, causing the capacitor to discharge through them at a higher rate than is acceptable. The output voltages do not have the proper voltage logic levels, being in fact inverted in logic sense and requiring additional inverting output stages to operate in the circuit of FIG. 2. Further, no provision is made for enabling each individual detector as required in the discussion of FIG. 2. For these reasons an operational relative voltage level detector is preferable, such as is shown in FIG. 4. As with FIG. 3, it also comprises three separate but very similar circuits, one for each input voltage. The components in FIG. 4 corresponding to similar components in FIG. 3 have the same reference characters but the suffix *a* is dropped. For example, transistor Q13 in FIG. 4 performs exactly the same function as transistor Q13*a* in FIG. 3. Furthermore, the signal line reference characters of FIG. 2 correspond to FIG. 4 terminal reference characters.

The individual section of the operational relative voltage level detector for channel 1 comprises first NPN transistor Q11 having an extremely high input impedance, such as is associated with field effect transistors. The collector of transistor Q11 is connected to a positive voltage source $V_o$. The base of transistor Q11 serves as input terminal IN1 (also shown in FIG. 2). Emitter follower resistor R13 connects the emitter of transistor Q11 to ground. Resistor R14 connects the emitter of transistor Q11 to the base of NPN transistor Q13. The base of transistor Q12 serves as the input for enabling voltage terminal EN1 shown in FIG. 2. The emitter of transistor Q12 is grounded and its collector is connected to the base of transistor Q13. One terminal of resistor R15 is connected to the voltage source; the other terminal is connected to the collector of transistor Q13 and the base of PNP transistor Q14. The emitter of transistor Q13 is connected to the anode of diode D12. The cathode of diode D12 is connected to one terminal of resistor R4, whose other terminal is connected to ground. The collector terminal of transistor Q14 is connected to the output terminal OUT1 (see also FIG. 2) and to one terminal of resistor R16, whose other terminal is connected to ground. The emitter of transistor Q14 is connected to the voltage source. The other sections receiving the voltages across capacitors C21 and C31 connect similar components similarly. In every case the cathode of the diode is connected to the point common to diode D12 and resistor R4. In the case of the circuit to which the terminals IN3 and OUT3 form input and output terminals, an extra diode, D33 is inserted in the emitter circuit of transistor Q33. All transistors except for the high impedance transistor whose base comprises the input to each detector circuit are of the type having very small transition zones from the cutoff condition to the saturated condition.

The operation of the circuit is very similar to the operation of the circuit of FIG. 3. The high impedance input transistors have been inserted to prevent any appreciable discharge of the capacitors through the detector circuit causing erroneous computation of the priority function. As the voltage across capacitor C11 increases, the impedance of transistor Q11 decreases causing the voltage across resistor R13 to increase. This voltage will be transmitted to the base of transistor Q13 unless transistor Q12 is conducting. Transistor Q12 conducts when flip-flop FF1 of FIG. 2 is in a reset condition. When flip-flop FF1 is in a reset condition the voltage signifying logical 1 will be applied to terminal EN1. Since this voltage is substantially more positive than ground, transistor Q12 will be saturated, grounding the base of transistor Q13. If flip-flop FF1 is set, then transistor Q12 will be cut off and base of transistor Q13 will sense the voltage variations across resistor R13. The operation of transistor Q13 is identical to that of transistor Q13a as explained for FIG. 3. When transistor Q13 is turned on the additional current through resistor R4 will tend to increase voltage on the emitters of transistors Q23 and Q33, thereby preventing them from conducting unless the base voltage applied to them is equal to or higher than that applied to transistor Q13. If transistor Q13 is not conducting then the voltage at its collector will be very close to $V_o$ and this voltage, applied to the base of transistor Q14, will cut transistor Q14 off. The voltage at terminal OUT1 will therefore be 0 volts and correspond to a logical 0. If transistor Q13 is turned on by a positive base voltage, the voltage on the base of transistor Q14 will be lower than $V_o$. This will turn transistor Q14 on and cause a positive voltage to appear at terminal OUT1, corresponding to a logical 1.

The operation of the other two sections of the circuit, receiving voltages on terminals IN2 and IN3, is the same as for this circuit. Current through resistor R4 will cut off completely those Qj3 transistors which have lower voltages being applied to them by transistors Q*j*1, as explained for FIG. 3. The *j* in the drawing reference Q*j*1, as well as in other references to circuit components in the drawings has the notational meaning as explained for the EN*j* reference. The result will be that almost always one OUT*j* terminal will have a logical 1 output, and the others will have a 0 output if their corresponding EN*j* terminal inputs are 0. The comments concerning two OUT*j* terminals having 1 outputs are again apropos. The portion of the circuit receiving its inputs from terminals IN3 and EN3 has one slight difference in the emitter circuit of transistor Q33 as compared to transistor Q13. A second diode, D33, has been added with its anode connected to the cathode of diode D32 and its cathode connected to the cathodes of diode D12 and diode D22. The effect of this additional diode is to require a higher input voltage for triggering transistor Q33 and producing a logical 1 on output terminal OUT3. The voltage at terminal IN3 must be enough higher than the voltage at terminals IN1 and IN2 so as to produce a voltage at the base of transistor Q33 higher by the drop across diode D33 than the voltage at the base of transistors Q23 and Q13 in order to turn transistor Q33 on in preference to the other two. The effect is to give channel 3 lower priority.

Many variations of the described embodiments are possible, e.g., the apparatus can provide priority computation for two or many more than three channels. The duration and voltage of the charging pulses from the AND gates need not be uniform from one circuit to the next. Charging voltage need not be a logic voltage pulse. The capacitor and bleeder resistor values can vary from one circuit to the next. A capacitor need not be utilized as the integrator. Digital counting or integrating means may be employed instead with the AND circuits providing triggering pulses to initiate the counting up and the bleeder resistors being replaced with countdown circuitry. Many other variations accomplishing the basic objectives will be apparent to one skilled in the art.

As an example of typical design for components and voltages in the operating system of FIG. 2 and FIG. 4, let us assume it is desirable to assign relative priorities of 1, 2, and 4 to properly weight response to input terminals IN1, IN2, and IN3 respectively. Further assume each AND circuit is controlled by generator G2 to produce pulses of amplitude 10 volts and duration of one-half microsecond.

Let us consider first the charging circuit in FIG. 2 of capacitor C11, resistor R11, and diode D11, ignoring for the moment resistor R12. Capacitor C11 is to be charged up in a series of steps by successive pulses. Since the emitter-base drop in the input transistors of level detector LD is about 0.2 volts, we will choose the incremental voltage produced by any pulse, $\Delta V$, as 0.2 volts. To a first approximation, the resistance R in such a circuit pulsed by amplitude V for a duration $\Delta t$ is given by $R = V\Delta t/C\Delta V$. Assuming capacitor C11 is 0.001 microfarad, substituting the above values in this equation yields R = 25 K ohms.

Now if all three circuits had resistors R*j*1 = 25 K ohms and capacitors C*j*1 = 0.001 microfarad, 10 successive pulses on each would raise the voltage on each capacitor C*j*1 to approximately 2 volts. Above this level the nonlinearity of the charging characteristic of the capacitor toward a fixed value (10 volts) would complicate calculations beyond what is necessary to explain the operation, but such operation is certainly feasible. Note, however, that the voltage of any capacitor C*j*1 is a direct measure of the occurrence and spacing of pulses; if pulses are more closely spaced on one, its corresponding voltage will rise above that of the others and remain so.

Diodes D*j*1 must only be chosen to handle the peak charging current of this combination, about 0.4 milliampere, the peak reverse voltage of 10 volts, have a forward-to-reverse resistance ratio of about 100 and be able to pass the short pulses described with little attenuation.

To achieve weighting of the inputs as described earlier, the discharge resistors $Rj2$ are employed. In the interest of minimizing the effect of each resistor $Rj2$ on its associated charging circuit, its value is chosen at twenty times resistor R11, or 500 K ohms. This value, when used as resistor R12, will effectively discharge capacitor C11 slowly over a period of about 60 times the pulse width, or 30 microseconds. To weight priority of data channels DC2 and DC3 by factors of 2 and 4 respectively, select, or adjust resistance R22 to be 250 K ohms and resistor R32 to be 125 K ohms. Resistor R32 is still five times resistor R31 and enough to insure minimal loading of the charging circuit. A single voltage increment on capacitors C21 and C31 would decay in about 15 and 7.5 microseconds, respectively. Therefore data channel DC1 tends to maintain higher priority than channel 2 by a time factor of 2 and a higher priority than channel 3 by a time factor of 4. Thus, it can be seen that the residual voltages on the capacitors $Cj1$ store the recent history of pulses applied in the desired weighted fashion, thereby hedging the action of the inputs of level detector LD correspondingly.

Having described an embodiment of my invention, what I claim is:

1. Apparatus for allocating priority of access to a data bus among a plurality of data channels simultaneously ready to communicate with the data bus, each issuing a request signal when ready to communicate and starting communication upon receiving an answer signal from the data bus, comprising:

a. a plurality of means for developing and storing a priority function, each associated with a data channel and adapted to vary the data channel's priority function in response to its request signal and any data channel answer signal; and b. means for selecting the data channel issuing a request signal and having a priority function indicating the highest priority.

2. The apparatus of claim 1 wherein the means for developing and storing a priority function further includes means for decreasing the priority function over time.

3. Apparatus for allocating priority of access to a data bus among a plurality of data channels simultaneously ready to communicate with the data bus, each data channel issuing a request signal when ready to communicate and starting communication upon receiving an answer signal from the data bus, comprising:

a. a plurality of memory elements, each associated with a data channel and adapted to receive its request signals and answer signals, and further adapted to generate a set signal after receiving a request signal until receiving an answer signal;

b. a plurality of means for accumulating and storing a priority function, each associated with a data channel, and responsive to the data channel's set signal and any answer signal; and c. means for selecting the priority function indicating highest priority, from among the plurality of priority functions stored by said accumulating and storing means which are receiving set signals.

4. Apparatus for allocating priority of access to a data bus among a plurality of data channels simultaneously ready to communicate with the data bus, each data channel issuing a request signal when ready to communicate and starting communication upon receiving an answer signal from the data bus, comprising:

a. means associated with the data bus for generating a first signal in conjunction with said answer signals generated by said data bus;

b. means associated with each data channel for receiving and accumulating said first signals when said data channel has issued a request signal;

c. comparing means, responsive to all of said data channel receiving and accumulating means, for identifying the requesting channel having the largest accumulation of said first signals; and d. priority selection means associated with said data bus for allocating priority to said data channel identified by said comparing means.

5. Apparatus as claimed in claim 4 further comprising means associated with each data channel, and responsive to said data channel answer signal, for inhibiting the operation of said receiving and accumulating means a predetermined time after the arrival of said data channel answer signal and until said data channel's request signal is again subsequently issued.

6. Apparatus as claimed in claim 5 further comprising means for decreasing the magnitude of said accumulated first signals as a function of time.

7. Apparatus for allocating priority of access to a data bus among a plurality of data channels simultaneously ready to communicate with the data bus, each issuing a request signal when ready to communicate, and starting communication upon receiving an answer signal from the data bus, comprising:

a. a plurality of memory elements each receiving request signals from a data channel and answer signals for that data channel and generating a set signal after each request signal until an answer signal is received;

b. a pulse generating system including a plurality of output pulse terminals, and a plurality of gating means for causing emission of pulses from a pulse terminal responsive to a set signal and any answer signal;

c. a plurality of integrators, each receiving pulses from a pulse terminal, cumulatively forming the time integral of each pulse and decaying the value of the integral with time; and d. means for selecting, responsive to the set signals, a plurality of integrals, measuring the relative size of each integral, and generating a signal identifying the integrator storing the largest of these integrals.

8. The apparatus of claim 7 wherein the pulse generating system and the plurality of integrators comprise a generator producing electrical pulses in response to answer signals; a plurality of AND gates each receiving the output of the pulse generator and a set signal; a plurality of capacitors, each receiving the output of an AND gate; and a plurality of impedances, each connected in parallel with a capacitor.

9. The apparatus of claim 8, including a plurality of means inserted between the AND gates and the capacitors, each having a low impedance to current pulses passing from the AND gates to the capacitors, and a high reverse impedance.

10. The apparatus of claim 7 wherein each memory element comprises an electronic flip-flop responsive to a request signal and also responsive to an answer to the request signal.

11. The apparatus of claim 7 including a plurality of signal delay means, each connected to a memory element, and each receiving an answer signal and delaying its transmission to the memory elements until after the integrators have received the pulses from the pulse terminals.

12. The apparatus of claim 7 wherein each integrator comprises means for generating a voltage signal following the value of the integral.

13. The apparatus of claim 12 wherein said means for selecting the largest of said integrals further comprises:

a. a plurality of first variable impedance means, each having a first power terminal, a second power terminal, and a control terminal receiving one of said output voltages causing the impedance of the variable impedance means to decrease if said voltage applied across the control terminal and the first power terminal is increased and increase if voltage so applied is decreased;
b. first fixed impedance means having two terminals;
c. first connecting means for connecting all the first power terminals to a terminal of the first fixed impedance means;
d. a plurality of second fixed impedance means, one terminal of each connected to one of the second power terminals with the opposite terminals of all commonly connected; and
e. a voltage source having one output terminal connected to the commonly connected terminal of the second fixed impedance means, and the second output terminal connected to the terminal of the first fixed impedance means common to the terminal of the integral holding means.

14. The apparatus of claim 13 wherein each of said variable impedance means comprises a transistor.

15. The apparatus of claim 13 including a plurality of second variable impedance means for receiving the outputs of the integrators and transmitting them to said respective first impedance means.

16. The apparatus of claim 15 wherein each of said second variable impedance means comprises a field effect transistor.

17. Apparatus for allocating priority of access to a data bus among a plurality of data channels simultaneously ready to communicate with the data bus, each issuing a request signal when ready to communicate and starting communication upon receiving an answer signal from the data bus, comprising:

a. a plurality of means for developing and storing a priority function, each associated with a data channel and adapted to increase the indicated priority of the data channel's priority function in response to its request signal and any data channel answer signal; and
b. means for selecting the data channel issuing a request signal and having a priority function indicating the highest priority.

18. The apparatus of claim 17 wherein the means for developing and storing a priority function further includes means for decreasing the priority function over time.

* * * * *